Patented Nov. 18, 1930

1,781,841

UNITED STATES PATENT OFFICE

ALBERT HARTZELL, OF YONKERS, NEW YORK, ASSIGNOR TO BOYCE-THOMPSON INSTITUTE FOR PLANT RESEARCH, INC., OF YONKERS, NEW YORK, A CORPORATION OF NEW YORK

INSECTICIDE AND METHOD OF PRODUCTION

No Drawing. Application filed July 9, 1926. Serial No. 121,497.

This invention relates to insecticides and methods of producing the same and more particularly to an insecticide particularly useful in exterminating the red spider mite (Tetranychus telarius L).

This pest presents one of the most difficult problems of the entomologist. Substances that have been found toxic to this species prove injurious to foliage and therefore unsuitable for application to plants and the standard insecticides nontoxic to plants are not suitable for use in exterminating the red spider mites due to the fact that such insecticides kill less than 50% of them. The high reproductive capacity of the pest renders these standard insecticides practically worthless as the mites multiply faster than they are exterminated unless repeated applications of the insecticides are made.

I have found that a mixture of sulphur and miscible oil produces an insecticide that is very effective in the extermination of this pest and is not injurious to the foliage of plants. The use of sulphur or miscible oil alone is not effective. Tests that I have conducted show that the former kills about 13% of the pests, the latter about 42%, while my new compound kills over 98%.

The insecticide may be prepared in any one of several ways. A mechanical mixture of colloidal sulphur and miscible oil may be prepared or the sulphur may be distilled and the fumes passed into a miscible oil or a mixture of oil, soap and water. Various oils may be employed. A miscible oil having a paraffin or asphalt base with a viscosity between 90 and 250 at a temperature of 100 degrees F. and a specific gravity of 0.87-0.93 at a temperature of 20 degrees F. may be employed. Ordinary lubricating oils are suitable for this purpose. When the sulphur is employed in a mixture of oil, soap and water, potash fish-oil soap is mixed with the oil and water to form an emulsion and the sulphur distilled and passed into it.

When preparing the material according to the first method, I first prepare a mixture of 20 parts by volume of colloidal sulphur and one part by volume of a suitable miscible oil. As stated, mineral oils of a paraffin or asphalt base may be employed and ordinary lubricating oils are suitable for this purpose. The mixture of the oil and the sulphur is thoroughly agitated and permitted to stand for two or three minutes. To the emulsion produced I then add 79 parts by volume of colloidal sulphur and thoroughly mix the two materials together. This forms a creamy white emulsion which may be applied at full strength or diluted with water as the occasion demands. It may be applied by means of any spraying apparatus, such as compressed air sprayers now used in the application of insecticides to plants and foliage.

The colloidal sulphur may be prepared by passing sulphur fumes into a solution of soap and water to produce a product containing substantially ten pounds of sulphur, 4 pounds of potash fish oil soap and fifty gallons of water. The invention, however, is not restricted to colloidal sulphur prepared in this manner as other forms of colloidal sulphur may be employed and the material may be purchased in the open market.

In preparing the insecticide according to the second method, ten pounds of flowers of sulphur are vaporized in an iron retort and conducted into fifty gallons of water containing 1% of miscible oil. Substantially four pounds of potash fish-oil soap are added to each fifty gallons of the solution to prevent flocculation of the sulphur particles. I preferably employ a fish-oil soap having a moisture content of 40-56%. The solution is maintained in rapid circulation by means of a pump agitator or the like, in order that the sulphur fumes may be forced into the solution and thoroughly mixed with the oil. The solution is preferably maintained in a heated condition at a temperature below 100 C. during the mixing operation.

In preparing the insecticide according to the third method, five grams of flowers of sulphur e. g. are vaporized in a retort and conducted into a flask containing 250 c. c. of a suitable oil. The delivery tube from the retort is arranged below the surface of the liquid in the retort. This stock solution is then mixed with water in the proportion of one part by volume of the solution to 99 parts by volume of water, and sprayed on the plants to be treated.

Various miscible oils may be employed for this purpose. Mineral oils with emulsifying agents or combinations of mineral oils and vegetable oils or oils made miscible by the addition of alcoholic soaps may be used.

As stated the results obtained from the use of the compound forming the subject-matter of my invention materially exceed the results obtained from the use of sulphur or miscible oil alone. In tests conducted to determine the efficiency of the insecticide, infested plants were employed under greenhouse conditions and it was found that in a period of from 24 to 48 hours the percentage of pests killed by colloidal sulphur was 13.2%, by a solution of miscible oil and water consisting of one part miscible oil and 99 parts water, 42%, and by my insecticide more than 98%.

A series of tests were also conducted to determine the tolerance of various species of plants to this spray. I have found that the majority of plants may be treated with this spray without injury to the foliage.

In addition to the forms of colloidal sulphur mentioned above, a dry product made by subliming sulphur on a colloidal clay, such as bentonite or wilkinite may be employed in the manufacture of this insecticide. The sulphur content of this constitutent may vary from 1 per cent to 25 per cent per dry weight of the powder. In making up the insecticide according to this method the dry powder is dispersed in water containing 1 per cent miscible oil.

I claim:

1. An insecticide consisting essentially of colloidal sublimed sulphur dispersed in a miscible oil.

2. An insecticide consisting essentially of a mixture of colloidal sublimed sulphur and oil.

3. An insecticide consisting essentially of an emulsion of oil, soap and water, and colloidal sublimed sulphur.

4. An insecticide consisting essentially of an emulsion of fish oil soap and water, and colloidal sublimed sulphur.

5. An insecticide consisting essentially of an emulsion of potash fish oil soap and water, and colloidal sublimed sulphur.

6. An insecticide consisting essentially of colloidal sublimed sulphur containing substantially 1% of miscible oil.

7. An insecticide consisting essentially of colloidal sublimed sulphur containing less than 10% of a miscible oil.

8. An insecticide consisting essentially of minute particles of colloidal sublimed sulphur in an emulsion of fish oil soap and water.

9. The process of forming an insecticide which comprises, condensing sulphur vapor in the presence of a miscible oil.

10. The process of forming an insecticide which comprises, condensing sulphur vapor in a solution of an oil, fish oil soap and water.

In testimony whereof I affix my signature.

ALBERT HARTZELL.